Figure 3:
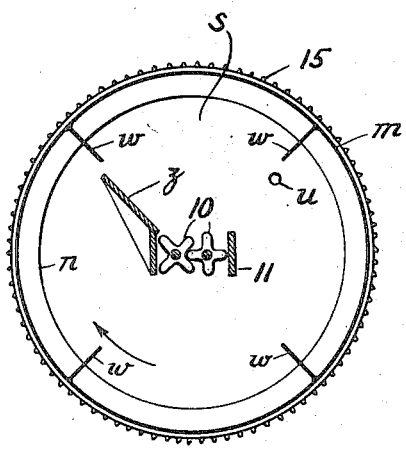

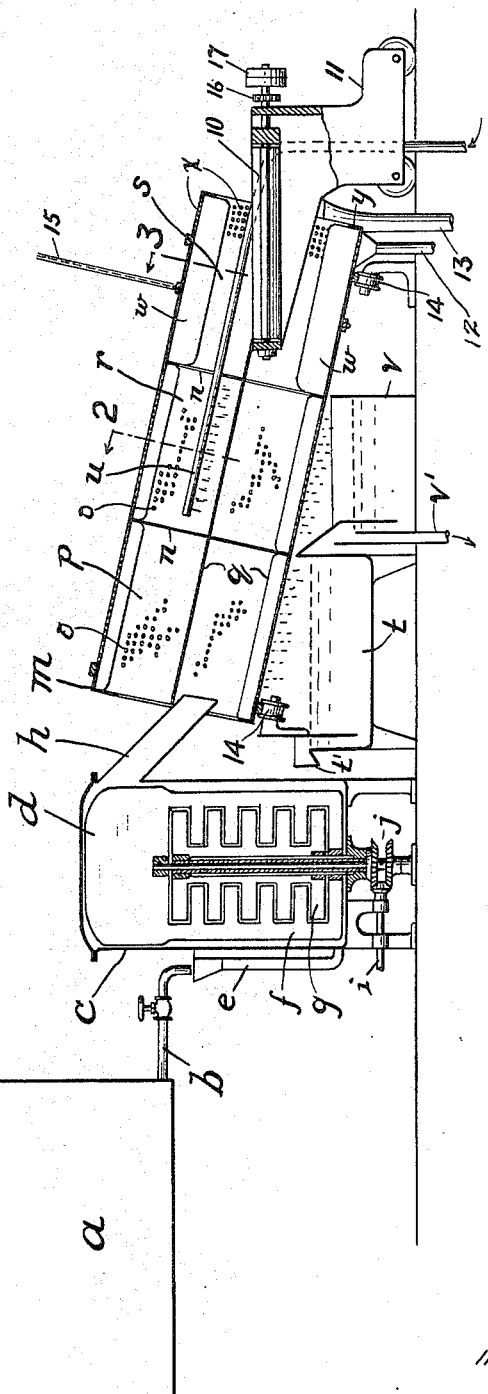

Nov. 29, 1927. 1,650,625
C. H. HAPGOOD
BUTTER MAKING APPARATUS
Original Filed Dec. 15, 1925    2 Sheets-Sheet 2

INVENTOR
Cyrus Howard Hapgood
BY
Busser and Harding
ATTORNEYS.

WITNESS:

Patented Nov. 29, 1927.

1,650,625

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

BUTTER-MAKING APPARATUS.

Original application filed December 15, 1925, Serial No. 75,522. Divided and this application filed December 3, 1926. Serial No. 152,327.

The object of my invention is to expedite the manufacture of butter and reduce the loss of butter fat.

The manufacture of butter by the usual method involves the mechanical agitation or manipulation of the cream until it breaks into butter (churning), the separation of the buttermilk, and the washing, salting and working of the butter. All these operations are usually conducted in batch in a standard churn.

I have discovered that it is practicable, economical, and more expeditious, to conduct these successive operations in a substantially continuous manner; more specifically, to produce a flowing stream of cream and, in the course of its flow, to gradually convert the cream into finally worked butter by first, at one locus, whipping the cream in said flowing stream until it breaks into butter, with resultant formation of butter granules and buttermilk; to then, at a more advanced locus in the stream, separate the buttermilk from the butter granules and remove the buttermilk; to then, at a still more advanced locus in the flowing stream, wash the partly made butter with water and carry off the water; and to then, at the most advanced locus, salt and work the butter. While these various operations are successive as applied to any particle of cream or extracted butter fat, they are simultaneous in so far as they are applied, at the same time, at different points along the length of the stream; and the completely manufactured butter is discharged, more or less continuously, at the end of the stream, which, as a whole, comprises cream at one end, finished butter at the other end, and, between the ends, butter fat at every stage of conversion from cream to finished butter.

While issued patents disclose the churning of cream into butter fat and buttermilk continuously, and also, in a continuous process, a churning operation followed by draining off some of the buttermilk, heating the butter fat to convert it into butter oil, and separating the remaining buttermilk from the oil, it is believed that a process whereby the usual steps of churning, draining off of buttermilk, washing with water and draining, and working into butter have never been practiced in a continuous manner. The novel features of such a process are not, however, herein claimed, the same forming the subject-matter of an application filed by me December 15, 1925, Serial No. 75,522, of which this application is a division. The subject-matter of the present invention is the apparatus wherein the continuous process is capable of being practiced, and particularly that part of the complete apparatus which performs, in a continuous manner, the operations following churning.

It is well known that by ordinary churning methods, there is a loss of butter fat approximating, on the average, nine-tenths of one per cent. By my improved continuous process, which the apparatus herein described and claimed is capable of carrying out in a highly efficient manner, I am able to reduce the loss to about one to two-tenths of one per cent, thereby effecting a saving of from seven or eight-tenths of one per cent with a resultant saving in the ultimate cost of the butter of a substantial fraction of a cent. I have also found that, in my process, the manufacture proceeds much more expeditiously. The materials require less (almost no) handling and hence there is a substantial saving in labor.

In the drawings, which show a preferred embodiment of my invention—

Fig. 1 is a side view, mainly in section, of the entire apparatus.

Figure 2:
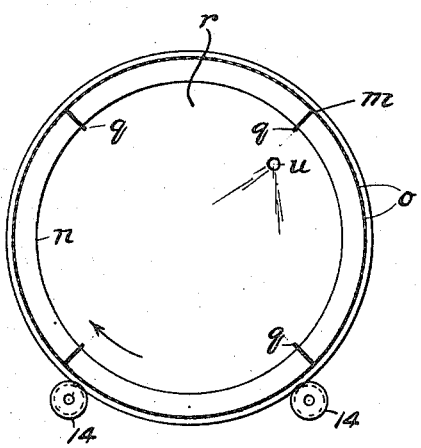

Figs. 2 and 3 are enlarged cross-sections on lines 2 and 3 respectively of Fig. 1.

Figure 4:
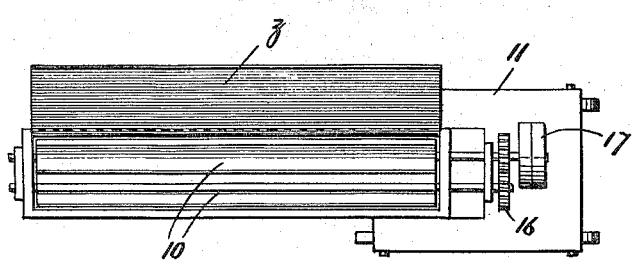

Fig. 4 is an enlarged plan view of the butter working contrivance.

The cream to be made into butter is fed continuously from a tank or reservoir $a$ through a valved pipe $b$ into a beater or whipper, which may be of the type shown in the Hapgood Patent No. 1,486,577, dated March 11, 1924. This whipper comprises a container $c$ having an inlet in its lower part and an outlet in its upper part, a whipping contrivance of substantially less height than the container and whose upper end is below the outlet, and an ejecting plate $d$ above the whipping zone. The cream from the tank $a$ feeds through the pipe $b$ into an upright receiving tube or chamber $e$ communicating with the inlet to the container $c$. This tube should be of less height than the container and of such height that it provides a column of cream adapted to balance the desired height of the column of cream, partially and wholly whipped cream, butter granules and buttermilk in the container. The whipping contrivance preferably consists of a vertical shaft carrying a frame $f$ comprising a series of radial blades, and a sleeve on the shaft carrying a frame $g$ comprising another series of radial blades, the blades of the frames extending in opposite directions and arranged in alternate relation. The plate $d$ rotates with one of the frames and is adapted, when rotated, to pass over the outlet and discharge the butter granules and buttermilk through the outlet into a discharge pipe $h$. The frames $f$ and $g$ are rotated in opposite directions from a shaft $i$ through intermediate gearing $j$. The shaft $i$ should be rotated from a variable speed motor, so as to regulate the speed, and hence the strength of the rotative impulses, of the whipping or beating blades. The described factors should be so adjusted as not only to thoroughly whip the cream but to whip it beyond the whipping stage until it breaks into butter. The resultant butter granules and buttermilk are displaced upwardly into the zone above the whipping zone, where there is imparted to the mixture, by means of the ejector $d$, a rotative movement in one direction and a displacement outwardly through the outlet (which should preferably be tangentially arranged) into the pipe $h$.

Communicating with the pipe $h$ is a buttermilk separator, beyond which is a washer, and beyond which washer is a butter worker. These elements are shown as embodied in substantially a single apparatus divided into zones or sections through which the stream of material, in its various stages of conversion into finished butter, successively passes. The main element of the apparatus comprises an inclined rotatable cylinder $m$ provided with two rings $n$ of limited width that divide the cylinder into a buttermilk separating section $p$, a washing section $r$ and a butter salting and working section $s$. Sections $p$ and $r$ are provided with perforations $o$, and with narrow wings $q$ that extend along the periphery of the cylinder parallel to its axis.

Through the perforations in section $p$, the buttermilk escapes into a tank $t$ having an overflow outlet at $t'$.

Wash water is introduced into section $r$ through a perforated pipe $u$. Through the perforations in section $r$ the wash water escapes into a tank $v$ having an outlet at $v'$.

The butter-working section $s$ of the cylinder is imperforate, except that near its lower end it is provided with perforations $x$ for the escape of salt water into a brine outlet 12. The section $s$ is provided with wings $w$ of substantial width that extend along the periphery parallel to the axis of the cylinder. The lower end of the section may be provided with an annular end wall or rim $y$, but this rim should be of small width so as to surround a capacious opening into which extends a pair of working rolls 10. An inclined collecting board $z$ is located adjacent to the rolls. The wings $w$ deliver the unworked butter to the collecting board $z$, which delivers it to the rolls 10. The rolls may be withdrawn from the cylinder to allow access to the interior thereof. The worked butter ultimately reaches the lower end of the cylinder, whence it is discharged through the butter discharge 13.

If, as is usual, the butter is salted, the salt may be introduced, from time to time, through the open lower end of the cylinder above the working rolls, by hand, or continuously by a conveyor (not shown).

The cylinder turns on trunnions 14 and may be rotated by means of a chain drive 15. The working rolls may be geared together and one of the gears 16 may be on the shaft of a driving pulley 17.

The cream is fed, in a continuous stream, from the tank $a$, into the whipper or beater $c$, which functions as a churn to whip or beat the cream until it breaks into butter, the buttermilk and butter granules being conveyed, in a substantially continuous stream, to the separating section $p$ of the cylinder $m$. Here the mixture is repeatedly picked up and carried partially around by the wings $q$ and the buttermilk drains off and flows out the perforations $o$ into the tank.

The butter granules, besides the described operation, have imparted to them a progressive forward movement, due to the inclination of the cylinder $m$, and pass into the washing zone $r$ of the cylinder. Here, they are subjected to the same kind of manipulation to which they are subjected in zone $p$, and during such manipulation are sprayed with water from the pipe $u$. The wash water flows out the perforations $o$ into the tank $v$.

The separated and washed, but unworked, butter then passes into the final zone $s$, wherein it is repeatedly picked up by the wings $w$ and deposited on the collecting board $z$, down which it slides into the working rolls 10. At the same time the butter is salted if salted butter is desired as the ultimate product. The salt water escapes through the perforations $x$. The butter, as it progresses toward the lower end of the cylinder, is repeatedly picked up by the wings $w$ and deposited on the collecting board $z$ and is repeatedly subjected to the working action of the rolls 10. Finally the worked butter is discharged at 13.

It will thus be seen that the butter-making operation is substantially continuous throughout. The time during which the material is subjected to the churning operation may be regulated by adjusting the flow of cream to churn *d*. The degree of working of the butter may be regulated by varying the speed of the rolls 10 and by pushing the rolls into the cylinder to a greater or less distance. Therefore, the operator has within his control all the factors required to produce the desired finished product.

It will be understood that churn *c* involves, per se, no novelty, although the same has not heretofore been combined with other elements adapted to convert the churned product into finished butter; and that the apparatus which embodies such other elements is the part of the complete apparatus that is novel per se.

Having now fully described my invention, what I claim and desire to protect by Letters Patent is:

1. An apparatus for continuously converting churned cream into butter which comprises an inclined rotatable cylinder adapted to receive the churned product, a water supply to the cylinder, the cylinder being perforated to permit the escape of buttermilk and wash water, a butter worker, and means operable in the rotation of the cylinder to convey the separated and washed product to the butter worker.

2. An apparatus for continuously converting churned cream into butter which comprises an inclined rotatable cylinder adapted to receive the churned product, a water supply to the cylinder, the cylinder being perforated to permit the escape of buttermilk and wash water, and a continuously operable butter-working contrivance positioned to continuously receive the separated and washed product and work it into butter.

3. An apparatus for continuously converting churned cream into butter which comprises an inclined rotatable cylinder adapted to receive the churned product at its higher end, the cylinder comprising a buttermilk separating zone at its higher end, a washing zone between its ends and a butter-working zone at its lower end, and means in the lower zone to work the butter.

4. An apparatus for continuously converting churned cream into butter which comprises an inclined rotatable cylinder adapted to receive the churned product at its higher end, a water supply adapted to discharge water into the cylinder, means allowing the escape from the cylinder of buttermilk and water, a butter-working contrivance in the lower end portion of the cylinder, and means within the cylinder adapted to lift the butter and convey it to the butter-working contrivance.

5. An apparatus for continuously converting churned cream into butter which comprises an inclined rotatable cylinder adapted to receive the churned product at its higher end, butter-working rolls in the lower end of the cylinder, and wings on the interior of the lower part of the cylinder adapted to lift the butter, as the cylinder turns, above the level of the rolls, the rolls being adapted to receive the butter so lifted and work the same.

6. An apparatus for continuously converting churned cream into butter which comprises a cylinder through which the churned product is conveyed, the far end of the cylinder having an opening, a carrier, and a butter-working contrivance supported on the carrier and movable thereby into and out of said opening.

7. An apparatus for continuously converting churned cream into butter which comprises an inclined rotatable cylinder adapted to receive the churned product at its higher end, the cylinder comprising a buttermilk separating zone at its higher end, a washing zone between its ends and a butter-working zone at its lower end, and means in the lower zone to work the butter; the butter-working zone and washing zone of the cylinder each comprising a perforated cylindrical section, a vessel adapted to receive the buttermilk discharged through the perforations of the first zone, and a water conveyor extending into the second zone and adapted to discharge water thereinto.

In testimony of which invention, I have hereunto set my hand, at city of New York, New York, on this 26th day of November, 1926.

CYRUS HOWARD HAPGOOD.